United States Patent [19]

Barrella

[11] 4,238,554

[45] Dec. 9, 1980

[54] ABUSE RESISTANT ACTIVE METAL ANODE/FLUID CATHODE DEPOLARIZED CELLS

[75] Inventor: Joseph N. Barrella, Irvington, N.Y.

[73] Assignee: Duracell International Inc., Indianapolis, Ind.

[21] Appl. No.: 72,525

[22] Filed: Sep. 4, 1979

[51] Int. Cl.³ .................................... H01M 6/14
[52] U.S. Cl. ............................. 429/105; 429/194; 429/199; 429/218
[58] Field of Search ............... 429/105, 101, 194, 199, 429/218

[56] References Cited

U.S. PATENT DOCUMENTS

| 3,567,515 | 3/1971 | Maricle et al. | 429/105 |
| 3,639,174 | 2/1972 | Kegelman | 429/213 X |
| 3,926,669 | 12/1975 | Auborn | 429/199 X |
| 4,020,240 | 4/1977 | Schlaikjer | 429/199 X |
| 4,148,974 | 4/1979 | Eppley | 429/194 X |

Primary Examiner—Anthony Skapars
Attorney, Agent, or Firm—Ronald S. Cornell; Israel Nissenbaum; Martin M. Glazer

[57] ABSTRACT

An abuse resistant electrochemical cell having an active metal anode, a fluid cathode depolarizer, an inert cathode and an electrolyte solution. The cell components are arranged in terms of relative capacities and configuration such that a sufficient amount of the dischargeable anode metal is utilized prior to the cell reaching zero volts (caused by deactivation of the cathode) whereby, upon forced discharge, polarization of both anode and cathode and deep cell reversal occur within a short period of time thereafter. This short period of time is no greater than 15% of the initial discharge time to zero volts. The cell additionally contains sufficient fluid depolarizer such that a portion thereof remains at the time of such deep cell reversal.

28 Claims, 1 Drawing Figure

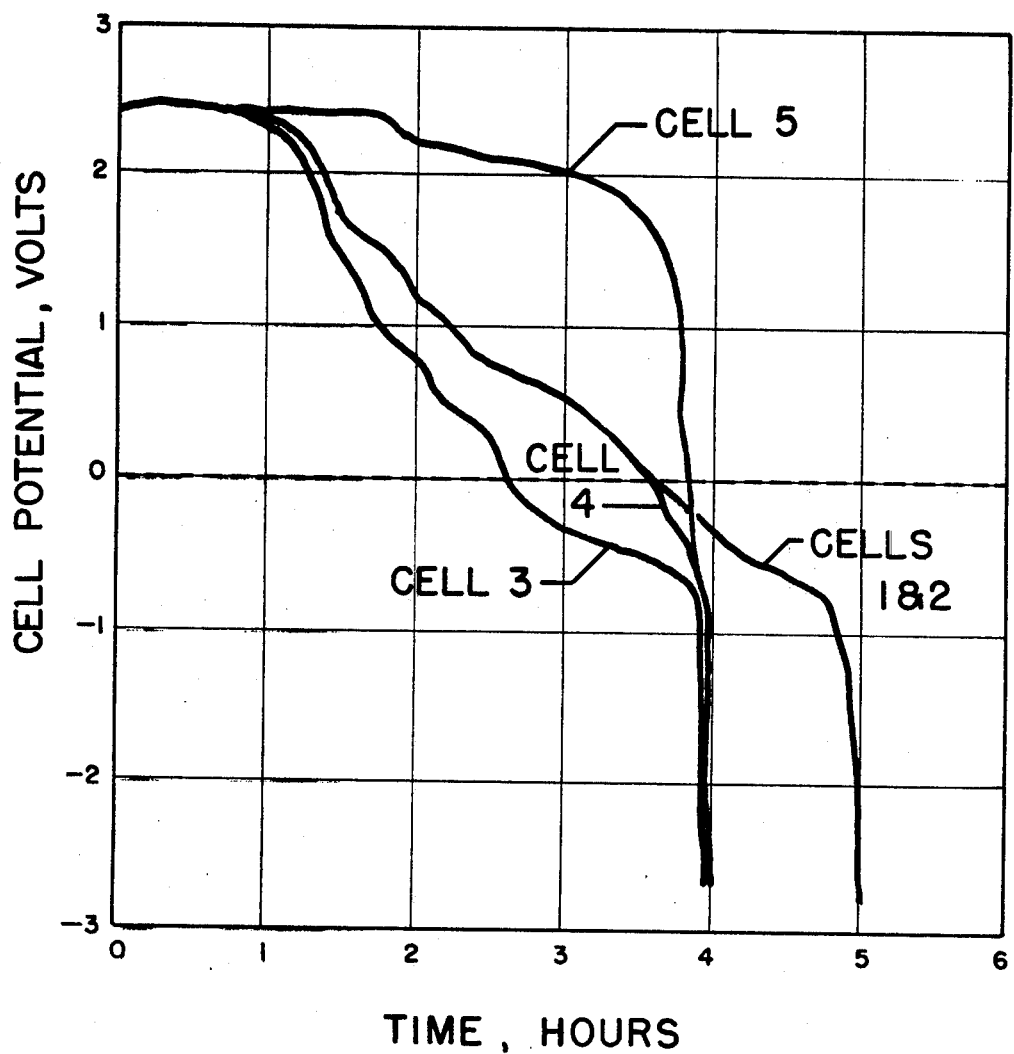

ABUSE RESISTANT ACTIVE METAL ANODE/FLUID CATHODE DEPOLARIZED CELLS

This invention relates to electrochemical cells containing active metal anodes and fluid cathode depolarizers and more particularly to nonaqueous cells containing lithium anodes and sulfur dioxide ($SO_2$) fluid cathode depolarizers.

Recently emphasis has been placed on the $Li/SO_2$ battery system as the most commercial embodiment of high energy density lithium cells. Such cells have exceedingly high energy densities, are dischargeable at high rates and voltages and are operable under varying temperature conditions including low temperature extremes. However, the very factors which make such cells attactive additionally impose various safety considerations. The reactivity of the cell components and in particular lithium requires that for commercial purposes the cells be made abuse resistant.

The most common of the abuse resistant expedients is a pressure vent which generally prevents explosions caused by excessive pressure within sealed cells. Such excessive pressure conditions generally result from abuse conditions such as cell short circuiting whereby high internal cell temperatures result with concomitant high pressures. However, it has been discovered that under other abuse conditions such as forced discharge or cell reversal, chemical reactions take place within the cell which may result in fires or explosions. Cell vents, while ameliorating such conditions, nevertheless are not generally effective in controlling such untoward reactions.

It is an object of the present invention to provide an abuse resistant cell having an active metal (generally defined as metals above hydrogen in the EMF series and specifically alkali and alkaline earth metals) anode and a fluid cathode depolarizer wherein explosion, fire and other untoward conditions are minimized or eliminated even under forced discharge or cell revesal.

It is a further object of the present invention to provide a cell having a lithium anode and a sulfur dioxide cathode depolarizer with such abuse resistance.

These and other objects, features and advantages of the present invention will be more clearly seen from the following discussion as well as the drawing.

BRIEF DESCRIPTION OF THE DRAWINGS

The single FIGURE of the drawing is a graph depicting discharge characteristics of various abused cells.

Generally the present invention comprises an abuse resistant electrochemical cell comprising an active metal anode (a metal above hydrogen in the EMF series), a fluid cathode depolarizer, an inert cathode which provides the cell reaction sites, and an electrolyte solution for ionic conductivity and material transport. The cell of the present invention preferably is anode limited at relatively low rates (about 1 mA or less) and room temperature (about 25° C.) but at increasingly higher rates and/or lower temperatures the capacity of the inert cathode as a reaction site is diminished whereby the cathode increasingly becomes the limiting factor in determining the end of cell life at zero volts. This change occurs because at the higher discharge rates and lower temperatures the outer surface of the cathode becomes a preferential reaction site with formed cell reaction products at the surface of the cathode preventing further utilization of the cathode interior. Higher discharge rates cause rapid reaction product build up at the cathode surface thereby blocking deeper penetration of the cathode as a reaction site. Lower temperatures generally reduce the conductivity of the electrolyte solution thereby also minimizing penetration of the cathode by the electrolyte. This results in only the cathode surface functioning as a reaction site.

In the cell of the present invention the relative capacities of the cell components - anode, cathode and fluid cathode depolarizer, are matched or balanced for conditions under which the cell becomes cathode limited such that the amount of dischargeable anode metal remaining, at the time the cell reaches zero volts (designated as $t_1$) caused by cathode deactivation and polarization does not unduly delay anode polarization and deep cell reversal if the cell is forced into reversal. Any delay (for a time, $t_2$) of anode polarization to the time of anode polarization and deep cell reversal (designated as $t_3$) should not exceed 15% of the initial time ($t_1$) to reach zero volts (assuming that the forced reversal rate is the same as the initial discharge rate) with $t_3-t_1$ or $t_2 \leq 0.15 \, t_1$ at discharge rate=reversal rate. Limitation of the initial capacity of the anode such that the anode remains the limiting electrode at even high rates or low temperatures results in cells having very low capacities under normal utilization conditions. Accordingly, cells such as $Li/SO_2$ cells have generally been constructed with clear excess lithium for high capacity and are generally cathode or cathode depolarizer limited. In addition to the requirement that the delay time to deep reversal ($t_2$) should not exceed 15% of the initial discharge time ($t_1$) there must be sufficient fluid depolarizer in the cell initially such that some (preferably 5% or more above the realizable anode capacity) fluid depolarizer remains at the time of deep cell reversal ($t_3$).

It is postulated that explosive or fire conditions in forcibly reversed cells may be attributable to the dendritic or high surface area plating of anode metal on the inert polarized cathode which plating continues on cell reversal until the dischargeable anode metal remaining at $t_1$ is fully depleted. At the time of anode metal depletion the anode is also polarized with concomitant deep cell reversal and increasing cell temperatures. If there is no fluid depolarizer remaining at the time of such deep cell reversal ($t_3$) the highly reactive dendritic or high surface area plated anode metal may react with other reactive cell components at the increasing cell temperatures with possible resultant explosion or fire. An example of a possible detrimental reaction includes lithium with the acetonitrile solvent commonly used in $Li/SO_2$ cells. Such reaction does not however occur during the initial discharge since the fluid depolarizer effectively prevents such reactions from occurring by the formation of a passivating film on the anode. However it has been discovered that even the presence of fluid cathode depolarizer at the time of deep cell reversal is generally ineffective in protectively passivating the dendritic or high surface area plated anode metal unless the amount of such plated anode metal is minimized such at $t_2 \leq 0.15 \, t_1$ as above described.

The time parameters above described are dependent upon various factors including cell discharge (and reversal) rates, temperature conditions, conductivity of the electrolyte, configuration and relative position of the electrodes and other factors which may determine the efficiency of the electrodes. Thus, for example, higher discharge rates reduce the capacity of the cathode with the rapid formation of non-conductive reaction products at the surface of the cathode which prevent further utilization of the cathode interior. As a result, the cell reaches zero volts more rapidly with additional anode metal remaining available for the detrimental dendritic or high surface area plating such that $t_1$ decreases and the delay time to deep cell reversal, $t_2$, increases.

Similarly lower temperatures by decreasing electrolyte conductivity thereby deactivate the cathode more rapidly causing $t_1$ to decrease and the delay time $t_2$ to detrimentally increase.

With respect to the conductivity of the electrolyte it must be noted that though it is a requirement that the fluid depolarizer be present at the time of deep cell reversal too much fluid depolarizer may in fact be detrimental to cell safety. Generally the highest conductivity of the cell electrolyte occurs at a fluid depolarizer concentration other than at saturation. Accordingly deviations in concentration, (both decreasing and increasing) of the fluid depolarizer within the electrolyte solution which adversely affect the electrolyte conductivity may result in premature deactivation of the cathode, in a manner similar to that of lowered temperatures which also decrease conductivity.

Configuration and relative positioning of the electrodes generally determine the efficiency of such electrodes whereby cell capacity may be increased thereby increasing $t_1$ and favorably reducing $t_2$. Examples of such configurations and positioning modifications include increased cathode porosity and surface area, minimization of cathode thickness with concomitant increase in outer surface reaction sites, and placement of anode and cathode adjacent each other for maximum utilization of the anode (the cathode should oppose the anode on both sides thereof).

In relating the relative capacities of the cell components, the capacity of the cathode depolarizer should be in stoichiometric excess over the amount of dischargeable active metal anode. Furthermore under conditions, such as high rates and/or low temperatures, when the cell becomes cathode limited, the capacity of dischargeable anode metal (correlative to the aforementioned delay time) should not exceed the actual capacity of the inert cathode under such conditions by more than 15%.

Since the use of a cell, when sold commercially, is generally unpredictable with respect to various consumer applications it must be assumed that the cell may be discharged at high rates thereby reducing the capacity of the inert cathode as a reaction site (lower $t_1$ and higher $t_2$). As a result it is likely that excess anode material will remain at the end of cell discharge (zero volts) with the possibility of delayed deep cell reversal (resulting from a delay in polarization of the anode) and detrimental dendritic plating. The cell should accordingly be initially preferably "balanced" as above described for a discharge rate of at least 1 ampere and most preferably if at least 2 amperes. Since maximum high rate consumer applications generally require from about 0.5 to 1.0 ampere drain rates such as for lighting and toys, the most preferred 2 ampere drain rate for balancing is believed to provide a sufficient safety margin for most consumer applications. At lower drain rates than 2 amperes, the anode metal is utilized more efficiently with an even lower value for $t_2$ providing safer cells.

In addition to the 2 ampere drain rate balancing, the cells should additionally be preferably balanced at a temperature of no more than about 0° C. and most preferably at a temperature no more than about −30° C. to further compensate for possible low temperature winter utilization. Increased drain rates and low temperature utilization both tend to shorten the life of the cell (to zero volts) by deactivating the cathode with concomitant underutilization of the active metal anode resulting in the increased possibility of excessive dendritic or high surface area anode metal deposition on the cathode prior to deep cell reversal. Accordingly, to provide a margin for safety the cells should preferably be capacity balanced at both the high drain rates and low temperatures above indicated.

The following discussion relates to the specific safety balancing of a cell having a lithium anode, a carbon cathode and a sulfur dioxide cathode depolarizer. However, it is understood that such balancing is applicable to other cells having different components and that any detail specified is for illustrative purposes only.

The theoretical capacity of lithium as an anode is 3.86 Ahr/gm and the theoretical capacity of $SO_2$ as a cathode depolarizer is 0.418 Ahr/gm. The capacity of a carbonaceous cathode based upon available surface area for use as reaction sites (about 85% porosity) is about 3 Ahr/gm.

In an actual cell, the realizable capacity of the lithium anode is dependent upon the anode configuration. Thus for example thin elongated lithium foil as in a "jelly roll" or convolute wound structure would tend to lose lithium capacity by the electrical disconnection of segments of the foil remote from the anode terminal. Similarly, lithium capacity is limited by an "external anode" configuration wherein a portion of the anode is unopposed by the cathode though still electrically connected. In a determination of the capacity of the lithium anode in the present invention, the disconnected lithium is not included in the lithium capacity for balancing purposes since such lithium by its disconnection is unavailable for the detrimental dendritic or high surface area plating on the cathode. However, lithium remaining which results from not being opposed by a cathode is included within the capacity determination of lithium of the present invention. Typically, in an exterior anode convolute wound structure, lithium foil provides 75–80% utilization in a lithium limited cell. In an exterior cathode configuration the percentage utilization is somewhat higher and is about 80–85%. This utilization does not vary to any great extent under differing cell discharge rates and/or temperature conditions unless other cell components provide cell limiting factors under such differing cell discharge rates and/or temperature conditions.

Because of the fluid nature of $SO_2$ cathode depolarizer its realizable capacity is generally close to that of the theoretical and is typically about 95–97% in an $SO_2$ limited cell. This generally remains constant despite changes in discharge rates and temperature conditions.

The cell component which is most sensitive to changing cell conditions is that of the carbonaceous cathode with its capacity as a reaction site varying widely under differing conditions of temperature, electrolyte conductivity and discharge rates. Thus for a 35 mil (0.0889 cm) thick carbonaceous cathode discharged against a lithium anode with a 70% $SO_2$—1 M LiBr acetonitrile depolarizer/electrolyte solution at room temperature (25° C.) and at a discharge rate of 0.88 mA, the carbon capacity is reduced from the theoretical to about 1.88 Ahr/gm. At lower temperatures and/or higher discharge rates the capacity of the cathode is still further reduced. Additionally since for the Li/SO$_2$ system described the optimum electrolyte conductivity (including allowance for change in SO$_2$ concentration engendered by depletion of the SO$_2$ by the cell reaction) is about 70% SO$_2$, changes of the SO$_2$ concentration such as to 60% or 80% will also reduce the capacity of the cathode. It is particularly preferred that the concentration of the SO$_2$ in the electrolyte not exceed 75%.

As an example of a safe cell (for anticipated consumer abuse) of the present invention similar cathodes have a cathode capacity of about 1 Ahr/gm of carbon at a discharge rate of about 2 Amps at a temperature of about $-30°$ C. Thus in the preferred construction of a safe cell (with an exterior cathode) in accordance with the present invention, 85% of the initial amount of lithium within the cell is balanced to provide a capacity no greater than about 15% more than the cathode capacity at $-30°$ C. at a discharge rate of 2 Amps. Similarly the amount of carbonaceous cathode may be balanced against the initial amounts and realizable capacity of the lithium anode. The amount of electrolyte and SO$_2$ contained within the cell should be adjusted to provide maximum conductivity and the amount of dischargeable SO$_2$ is further balanced against the realizable lithium capacity such that some SO$_2$ remains at the time the lithium is completely depleted by the forced discharge or cell reversal conditions. Since realizable lithium capacity in the convolute wound configuration (and conditions) above described is about 70% (85-15) of the original amount of lithium, the SO$_2$ amount may be adjusted accordingly to provide a realizable capacity of SO$_2$ above that of the lithium capacity and preferably at least 5% or more than the realizable capacity of the lithium.

The following examples of various cells with differing component ratios and configurations further illustrate the efficacy and safety of cells constructed in accordance with the present invention as compared to non "balanced" cells. All the cells described are discharged at a rate of 2 amperes at $-30°$ C. and forced into reversal at a rate of 2 amperes as well. It is understood that the following examples are for illustrative purposes only and not as limitations on the present invention. All parts are parts by weight unless otherwise indicated.

TABLE*

| CELL # AND EXAMPLE # | Li ANODE THICKNESS INCHES (cm) | THEORETICAL CAPACITY OF Li(A-hr) | ELECTROLYTE COMPOSITION** | THEORETICAL CAPACITY OF $SO_2$ (Ahr) | ACTUAL CAPACITY (A-hr) OF CARBON CAPACITY - BASED ON ZERO VOLTAGE (see drawing for discharge and reversal curves) | TIME TO 0 VOLTS $t_1$ (hrs) | TIME TO DEEP REVERSAL $t_3$ (hrs) | DELAY TIME $t_3$-$t_1$ $t_2$ (hrs) | $t_2$-$t_1$ | RESULTS |
|---|---|---|---|---|---|---|---|---|---|---|
| 1 | 0.01 (0.0254) | 11.5 | 70% $SO_2$ | 10.0 | 7.2 | 3.6 | 5 | 1.4 | .4 | CELL BULGED AND CHARRED |
| 2 | 0.01 (0.0254) | 11.5 | 80% $SO_2$ | 11.4 | 7.2 | 3.6 | 5 | 1.4 | .4 | CELL CHARRED |
| 3 | 0.008 (0.0203) | 9.2 | 80% $SO_2$ | 11.4 | 5.4 | 2.7 | 4 | 1.3 | .48 | HOLE BURNED THROUGH CELL |
| 4 | 0.008 (0.0203) | 9.2 | 70% $SO_2$ | 10.0 | 7.2 | 3.6 | 4 | .4 | .11 | VENT |
| 5 | 0.008 (0.0203) | 9.2 | 70% $SO_2$ | 10.0 | 7.85 | 3.9 | 4 | .1 | .03 | NO VENT |

*All cells constructed with:
21″ / 1.625″ (52.94 × 4.128 cm) Li foil anode,
23.5″ / 1.625″ / 0.035″ (59.7 / 4.128 × 0.0889 cm) cathode (carbon wt. 7 ± .6 gm, Al Exmet wt. 2.6 gms)
48″ (121.9 cm) Celgard separator; all convolutely wound with exterior cathode; and 34.2 gms. - electrolyte with $SO_2$ depolarizer. All cells discharged and forced into reversal at 2 amperes, −30° C.

**All 1M LiBr in acetonitrile -$SO_2$ solution except cell #5 which has 0.75M $LiA_sF_6$ electrolyte As seen from the preceeding Table as well as the drawing, cells 1-3, are unbalanced and are therefore generally unsafe under abuse conditions. Cells 4 and 5 are balanced in accordance with the present invention and are accordingly substantially safe for general consumer applications.

In cells 1 and 2 there is a particularly large excess of lithium remaining at the end of cell discharge (cathode deactivation) with resultant detrimental dendritic or high surface area lithium plating on the cathode. Cell 3 while having a lesser absolute amount of lithium nevertheless is also unsafe as a result of the lowered conductivity engendered by the lower conductivity of the 80% $SO_2$ electrolyte composition which prematurely deactivates the carbon cathode. The delay time, with dendritic or high surface area plating, between the end of cell discharge and the deep cell reversal of cells 1-3 is about 40 to 50% of the initial discharge time whereas cells 4 and 5 have delay times of only 11 and 3% respectively. It should further be noted that the use of the $LiAsF_6$ salt in cell 5 results in slightly lower viscosity of the electrolyte and increased material transport capability thereby slightly raising the cathode efficiency and increasing the utilization of the lithium prior to cell reversal.

From the drawing it may be further noted that there is no tradeoff by utilizing less lithium for the anodes in accordance with the present invention as might have been expected. The performance of cell 4 under a 2 amp discharge rate is almost identical to that of the greater lithium containing cells 1 and 2 and performance of cell 5 is considerably better than that of cells 1 and 2.

It should be further noted that unbalanced cells, particularly with low conductivity electrolytes such as 80% $SO_2$ may catch fire or explode even prior to the complete dendritic or high surface area plating of the anode lithium onto the cathode. The time of such untoward event is not considered the time of deep cell reversal for the purposes of the present invention since there is remaining lithium on the anode at the time of the fire or explosion.

The fluid cathode depolarizers utilized in the cells of the present invention include the aforementioned sulfur dioxide and other non-metallic oxides, fluid oxyhalides, non-metallic halides and mixtures thereof such as thionyl chloride ($SOCl_2$), phosporous oxychloride ($POCl_3$), selenium oxychloride ($SeOCl_2$), sulfur trioxide ($SO_3$), vanadium oxytrichloride ($VOCl_3$), chromyl chloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$) and sulfur monobromide ($S_2Br_2$). Fluid cathode depolarizers such as the ones enumerated may function as the electrolyte salt solvent or as a cosolvent with non-aqueous solvents including organic solvents such as propylene carbonate, acetonitrile, methyl formate, tetrahydrofuran and the like which have generally been used in non-aqueous high energy density lithium and lithium/$SO_2$ cells. Preferably the electrolyte salt or salts used should provide a conductivity in excess of $10^{-2}$ ohm$^{-1}$ cm$^{-1}$ at room temperature whereby maximum utilization of the cathode is possible. Examples of electrolyte salts having the requisite conductivities and compatibility commonly used in cells containing fluid cathode depolarizers include alkali and alkaline earth metal halides, tetrahaloaluminates, tetrahaloborates, clovoborates, hexafluorophosphates, hexafluoroarsenates, perchlorates and other electrolyte salts or solutes enumerated in patents such as U.S. Pat. Nos. 3,926,669 and 4,020,240.

Though lithium is the most preferred metal for the metal anode other high energy density metals such as alkali and alkaline earth metals such as sodium, potassium, rubidium, magnesium and calcium as well as other active metals above hydrogen in the electomotive series are useful in the present invention either alone, in combination or in various alloyed forms.

With respect to the inert cathode the preferred material for such cathode is carbon black such as Shawinigan black because of its high surface area. Other cathode materials include graphite and cell compatible porous metals such as titanium, nickel, copper and the like. Generally the carbonaceous cathodes are also constructed with small amounts (on the order of 5-10% by weight) of binders such as PTFE dispersed therein. The carbonaceous cathodes are typically pasted on expanded metal grids of metals such as aluminum to provide both structural integrity and to function as cathode current collectors.

It is understood that the above examples have been presented as a clarification and an illustration of the present invention and the efficacy thereof. Any detail contained in the above examples should not be considered as a limitation of the present invention. Changes in cell and component configuration, identity, relative capacities and the like may be made without departing from the scope of the present invention as defined by the following claims.

What is claimed is:

1. An abuse resistant electrochemical cell comprising an active metal anode, a fluid cathode depolarizer in a non-aqueous electrolyte solution and an inert cathode, wherein the realizable capacity of said inert cathode, relative to the realizable capacities of said anode and said cathode depolarizer, is dependent upon at least one variable parameter characterized in that under predetermined parameters, which result in said inert cathode being the limiting factor in the life of the cell and said predetermined parameters being selected as approximating abuse conditions, the relationship between the utilizable capacity of the active metal anode and the realizable capacity of the inert cathode is such that at the end of the discharge life of said cell, the quantity of dischargeable active metal remaining in the anode is no greater than about 15% of the amount of active metal already discharged; and that there is initially a stoichiometric excess of said cathode depolarizer above the initial amount of said utilizable anode metal.

2. The cell of claim 1 wherein said predetermined parameters include a discharge and a forced discharge rate of at least one ampere.

3. The cell of claim 2 wherein said discharge and forced discharge rates are each at least 2 amperes.

4. The cell of claim 1 wherein said predetermined parameters include an ambient discharge and a forced discharge temperature of no more than 0° C.

5. The cell of claim 4 wherein said ambient temperatures are no more than −30° C.

6. The cell of claim 4 wherein said predetermined parameters further include a discharge and a forced discharge rate of at least 2 amperes.

7. The cell of claim 1 wherein said active metal anode is comprised of lithium.

8. The cell of claim 7 wherein said fluid cathode depolarizer is selected from the group consisting of sulfur dioxide, thionyl chloride, phosphorous oxychloride, selenium oxychloride, sulfur trioxide, vanadium oxytrichloride, chromyl chloride, sulfuric oxychloride, nitryl chloride, nitrosyl chloride, nitrogen dioxide, sulfur monochloride, sulfur monobromide and mixtures thereof.

9. The cell of claim 8 wherein said fluid cathode depolarizer comprises sulfur dioxide.

10. The cell of claim 9 wherein said electrolyte solution comprises an electrolyte salt dissolved in acetonitrile.

11. The cell of claim 10 wherein said electrolyte salt is selected from the group consisting of LiBr and $LiAsF_6$.

12. The cell of claim 9 wherein said stoichiometric excess is at least 5%.

13. The cell of claim 9 wherein said sulfur dioxide does not exceed 75% by weight of said electrolyte solution.

14. The cell of claim 9 wherein said inert cathode comprises a carbonaceous material on a metal support.

15. An abuse resistant electrochemical cell comprising a lithium anode, a fluid sulfur dioxide cathode depolarizer in a non-aqueous electrolyte solution wherein said sulfur dioxide does not exceed 75% by weight of said electrolyte solution and an inert carbonaceous cathode wherein at a discharge rate of at least 2 amperes and an ambient temperature of no more than −30° C., said inert cathode is the limiting factor in the life of said cell, characterized in that at the end of the discharge life of said cell, the quantity of dischargeable lithium remaining in the anode is no greater than about 15% of the amount of lithium already discharged; and that there is initially at least a 5% stoichiometric excess of $SO_2$ above the initial amount of utilizable lithium metal.

16. The cell of claim 15 wherein said sulfur dioxide comprises about 70% by weight of said electrolyte solution.

17. An abuse resistant electrochemical cell comprising an active metal anode, a fluid cathode depolarizer in a non-aqueous electrolyte solution and an inert cathode, wherein the realizable capacity of said inert cathode, relative to the realizable capacities of said anode and said cathode depolarizer, is dependent upon at least one variable parameter characterized in that under predetermined parameters, which result in said inert cathode being the limiting factor in the life of said cell and said predetermined parameters being selected as approximating abuse conditions, the relationship between the utilizable capacity of the active metal anode and the realizable capacity of the inert cathode is such that, at the end of cell discharge with said cell being force discharged at a rate substantially equivalent to the initial discharge rate, the time required for anode polarization is no greater than about 15% of the time initially required to reach the end of cell life and wherein at the time of anode polarization there is remaining fluid depolarizer.

18. The cell of claim 17 wherein said discharge and said force discharge rates are at least 2 amperes.

19. The cell of claim 17 wherein said predetermined parameters include an ambient discharge and force discharged temperature of at most −30° C.

20. The cell of claim 19 wherein said discharge and said force discharged rates are at least 2 amperes.

21. The cell of claim 17 wherein said active metal anode is comprised of lithium.

22. The cell of claim 21 wherein said fluid cathode depolarizer is selected from the group consisting of sulfur dioxide, thionyl chloride, phosphorous oxychloride, selenium oxychloride, sulfur trioxide, vanadium oxytrichloride, chromyl chloride, sulfuric oxychloride, nitryl chloride, nitrosyl chloride, nitrogen dioxide, sulfur monochloride, sulfur monobromide and mixtures thereof.

23. The cell of claim 22 wherein said fluid cathode depolarizer comprises sulfur dioxide.

24. The cell of claim 23 wherein said electrolyte solution comprises an electrolyte salt dissolved in acetonitrile.

25. The cell of claim 24 wherein said electrolyte salts is selected from the group consisting of LiBr and $LiAsF_6$.

26. The cell of claim 23 wherein said remaining sulfur dioxide exceeds the initial utilizable lithium anode by a stoichiometric amount of at least 5%.

27. The cell of claim 23 wherein said sulfur dioxide does not exceed 75% by weight of said electrolyte solution.

28. The cell of claim 23 wherein said inert cathode comprises a carbonaceous material on a metal support.

* * * * *